United States Patent
Mehta et al.

(10) Patent No.: US 10,051,511 B1
(45) Date of Patent: Aug. 14, 2018

(54) RESPONDING TO UPLINK BACKHAUL CONGESTION BY AVOIDING INVOCATION OF UPLINK MIMO

(71) Applicant: Sprint Spectrum L.P., Overland Park, KS (US)

(72) Inventors: Dhaval Mehta, Aldie, VA (US); Jasinder P. Singh, Olathe, KS (US); Udit Thakore, Fairfax, VA (US); Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 81 days.

(21) Appl. No.: 15/364,170

(22) Filed: Nov. 29, 2016

(51) Int. Cl.
*H04W 28/02* (2009.01)
*H04B 7/0413* (2017.01)
*H04L 12/26* (2006.01)

(52) U.S. Cl.
CPC ...... *H04W 28/0284* (2013.01); *H04B 7/0413* (2013.01); *H04L 43/16* (2013.01); *H04W 28/0289* (2013.01)

(58) Field of Classification Search
CPC ......... H04W 28/0284; H04W 28/0289; H04W 28/02; H04B 7/0413; H04B 7/024; H04B 1/66; H04B 7/0452; H04L 43/16; H04L 43/0882
See application file for complete search history.

(56) References Cited

U.S. PATENT DOCUMENTS

| 2010/0316003 | A1* | 12/2010 | Sukiasyan | H04W 72/02 370/329 |
| 2012/0149411 | A1* | 6/2012 | Miyoshi | H04B 7/0413 455/501 |
| 2015/0365889 | A1* | 12/2015 | Rajendran | H04W 52/0206 455/453 |
| 2017/0222710 | A1* | 8/2017 | Eitan | H04B 7/0639 |
| 2018/0054757 | A1* | 2/2018 | Nanri | H04W 28/06 |

* cited by examiner

*Primary Examiner* — Paul H Masur
*Assistant Examiner* — Michael K Phillips

(57) ABSTRACT

When a base station is using multiple-input multiple-output (MIMO) communication defining multiple layers of communication to serve a user equipment device (UE) over an uplink channel, and the base station detects that its backhaul connection is threshold highly congested, the base station will responsively reduce the number of communication layers used to serve the UE over the uplink channel. In some examples, the base station could reduce the number of communication layers to a single layer, thereby transitioning from serving the UE using uplink MIMO communication to serving the UE using uplink single-input single-output (SISO) communication.

20 Claims, 4 Drawing Sheets

```
┌─────────────────────────────────────┐
│ DETERMINE THAT AN UPLINK            │
│ BACKHAUL CONNECTION OF A BASE       │
│ STATION IS THRESHOLD HIGHLY         │──── 46
│ CONGESTED                           │
└─────────────────────────────────────┘
                  │
                  ▼
┌─────────────────────────────────────┐
│ RESPONSIVE TO DETERMINING THAT      │
│ THE UPLINK BACKHAUL CONNECTION      │
│ IS THRESHOLD HIGHLY CONGESTED,      │
│ THE BASE STATION TRANSITIONS        │
│ FROM SERVING A UE USING UPLINK      │──── 48
│ MIMO DEFINING N LAYERS OF           │
│ COMMUNICATION TO SERVING THE UE     │
│ USING UPLINK MIMO DEFINING A        │
│ REDUCED QUANTITY M LAYERS OF        │
│ COMMUNICATION, WHERE M < N          │
└─────────────────────────────────────┘
```

RESPONDING TO UPLINK BACKHAUL CONGESTION BY AVOIDING INVOCATION OF UPLINK MIMO

BACKGROUND

In a wireless communication system, a base station provides one or more coverage areas, such as cells or sectors, in which the base station can serve user equipment devices (UEs), such as cell phones, wirelessly-equipped personal computers or tablets, tracking devices, embedded wireless communication modules, or other devices equipped with wireless communication functionality.

In general, each coverage area could operate on one or more carriers each defining one or more ranges of frequency spectrum and having a respective downlink channel for carrying communications from the base station to UEs and a respective uplink channel for carrying communications from the UEs to the base station. Such carriers could be frequency division duplex (FDD), in which the downlink and uplink channels are defined as separate respective ranges of frequency, or time division duplex (TDD), in which the downlink and uplink channels are defined on a common range of frequency but are distinguished through time division multiplexing. Further, the downlink channel and uplink channel of each carrier could also be divided into respective sub-channels for carrying particular communications, such as one or more control channels for carrying control signaling and one or more traffic channels for carrying application-layer data and other traffic.

In an example system, for instance, the air interface could be divided over time into frames, and each frame could be divided over time into sub-frames, with each sub-frame defining two slots. The uplink and downlink channels could each be divided over their frequency bandwidth into sub-carriers that are grouped within each slot into resource blocks, with portions of each sub-frame further defining various control channels for signaling communication between the base station and UEs.

Further, when a base station receives uplink data from an end-user UE, the base station could route this data to one or more entities on a packet-switched network, and the base station could do so in a variety of ways. For instance, if the base station is a relay base station, then the base station could route the uplink data to the packet-switched network via a wireless backhaul connection. The wireless backhaul connection could be supported by an air interface between a donor base station and a relay UE served by the donor base station. In such an arrangement, uplink traffic from an end-user UE could pass from the end-user UE to the relay base station, from the relay base station to the relay UE, from the relay UE to the donor base station, and from the donor base station to a network entity. Alternatively, if the base station is a conventional, non-relay base station, then the base station could route the uplink data directly to the packet-switched network via a dedicated backhaul connection rather than via a wireless backhaul connection involving a donor base station and a relay UE.

OVERVIEW

When a UE is positioned within coverage of a base station, the UE could attach with the base station on a particular carrier on which the base station is configured to provide service, and the base station could then schedule particular downlink and uplink resource blocks on that carrier to carry data communications to and from the UE.

In the example system noted above, for instance, when the base station has data to transmit to a UE, the base station could assign certain downlink resource blocks (and thus certain sub-carriers) in a given sub-frame for use to carry the data to the UE, and the base station could then (i) transmit to the UE in that sub-frame a downlink control information (DCI) message that specifies the assigned resource blocks and (ii) transmit the data to the UE in the assigned resource blocks in that sub-frame. Per the DCI message, the UE could then read the transmitted data from the assigned resource blocks. Likewise, when the UE has data to transmit to the base station and transmits a scheduling request to the base station, the base station could assign certain uplink resource blocks in a given sub-frame for use to carry the data from the UE and could transmit to the UE, in advance of that sub-frame, a DCI message that specifies the assigned resource blocks. And the UE could then transmit the data to the base station in the assigned resource blocks in that sub-frame.

Further, a base station and UE could also be configured to engage in air interface communication with each other using single-input single-output (SISO) technology or instead using multiple-input multiple-output (MIMO) technology with spatial multiplexing. SISO provides for air interface communication over a single propagation path from a single transmit-antenna at the transmitting end (e.g., at the base station or UE) to a single receive-antenna at the receiving end (e.g., at the UE or base station), whereas MIMO provides for air interface communication concurrently on multiple different radio-frequency propagation paths, from multiple transmit-antennas at the transmitting end to multiple receive-antennas at the receiving end. Thus, for a base station and UE to be capable of communicating using MIMO, both the base station and UE could be equipped with a number of antennas, a multiplexer for separating a signal for transmission via the antennas, and a decoder for reconstructing multiplexed signals that are received via the antennas. With spatial multiplexing, when the transmitting end has data to transmit to the receiving end, the data is multiplexed (e.g., time division multiplexed) onto multiple antenna output ports and thus onto multiple RF propagation paths, so that a separate portion of the data is transmitted respectively on each propagation path. In this arrangement, each propagation path is considered to be a MIMO "layer".

MIMO communication service could be characterized by how many transmit antennas (or transmit antenna groups), T, are used and how many receive antennas (or receive antenna groups), R, are used, as T×R MIMO service. Further, if T and R are equal, then the number of MIMO layers could be considered equal to T and R, whereas if T and R are different, then the number of MIMO layers could be considered the lesser of the two. Thus, MIMO service with two transmit antennas and two receive antennas (2×2 MIMO) could be considered to have two layers, MIMO service with four transmit antennas and four receive antennas (4×4 MIMO) could be considered to have four layers, and MIMO service with two transmit antennas and one receive antenna (2×1 MIMO) could be considered to have just one layer. Other examples and characterizations of MIMO modes and MIMO layers are possible as well, within the understanding of those of ordinary skill in the art.

When a base station serves a UE using MIMO with M layers, the base station could specify the MIMO configuration in the base station's DCI message to the UE when scheduling data communication to or from the UE to occur on particular air interface resources. In accordance with that MIMO specification, the base station and UE may then each make use of the indicated (or associated) number of antennas for their air interface communication with each other, with the data communication being spatially multiplexed over the indicated (or associated) number of layers. Thus, for communication in a given sub-frame, the base station could allocate particular air interface resources (e.g., particular resource blocks) for communication to or from the UE and could specify use of M MIMO layers; and all M of the MIMO layers could then share those allocated air interface resources, being distinguished from each other by at least their spatially separate RF propagation paths.

A base station could be configured to use MIMO technology when serving a UE over an uplink channel in certain situations. For instance, a base station could be configured to use uplink MIMO by default when serving a UE, or the base station could be configured to invoke the use of uplink MIMO responsive to a trigger event, such as the base station detecting that the UE has a threshold high extent of data queued for transmission from the UE to the base station. The base station could detect such a trigger event by receiving from the UE a buffer status report that indicates a quantity of data queued for transmission from the UE to the base station and determining that the indicated quantity of queued data exceeds a threshold quantity.

When a base station is serving UEs, the base station could encounter a situation where it could be desirable to reduce the rate at which the base station receives data from its served UEs. By way of example, if the base station receives data from its served UEs faster than the base station can forward the received data to one or more other network entities via a backhaul connection, then the backhaul connection could become highly congested with uplink data queued for transmission over the backhaul connection. Wireless backhaul connections, such as those connecting relay base stations to other network entities, could be particularly prone to such congestion. For instance, routing uplink data through a wireless backhaul connection could involve a relay UE sending a scheduling request to a donor base station, the donor base station responsively assigning uplink resource blocks for the data, and the UE transmitting the data in the assigned resource blocks. Such scheduling processes could add significant delay to the transmission of uplink data over the backhaul connection. This problem could be exacerbated even further if the donor base station serves the relay UE on a TDD carrier rather than an FDD carrier, as a TDD carrier could have a lesser extent of uplink resource blocks than an FDD carrier. In any case, when a backhaul connection between a base station and another network entity becomes congested with uplink traffic, it could be useful to reduce the rate at which the base station receives data from its served UEs in order to reduce the extent of data queued for transmission over the backhaul connection.

One way to address such congestion issues could be for a base station to identify which of its served UEs are being served on multiple layers of communication using MIMO and transition to serving the identified UEs on a fewer number of layers. Thus, in accordance with the present disclosure, when a base station is using a number of MIMO layers to serve a UE over an uplink channel, and the base station detects that its backhaul connection is threshold highly congested, the base station will responsively reduce the number of MIMO layers on which the base station serves the UE. In some examples, the base station could reduce the number of layers to a single layer, thereby transitioning from serving the UE using uplink MIMO to serving the UE using uplink SISO. The base station could detect that its backhaul connection is threshold highly congested by evaluating a variety of factors, including an extent of data queued for transmission from the base station to another network entity or an amount of time that data has been queued for transmission from the base station to another network entity. Other examples are possible as well.

Accordingly, in one respect, disclosed herein is a method of controlling communication over an uplink channel of an air interface between a UE and a base station, where the base station is configured to serve the UE over the uplink channel using MIMO communication defining N layers of communication, wherein N>1. Further, when serving the UE, the base station receives data from the UE over the uplink channel, and the base station sends the received data via a backhaul connection to an entity of a core access network. As disclosed, the method includes determining that the backhaul connection is threshold highly congested and, responsive to the determining that the backhaul connection is threshold highly congested, the base station transitioning from serving the UE over the uplink channel using MIMO communication defining N layers of communication to serving the UE over the uplink channel using MIMO communication defining a reduced quantity M of layers of communication, wherein M<N, and wherein M≥1.

In another respect, disclosed is a base station for controlling communication over an uplink channel of an air interface between a UE and the base station, where the base station is capable of serving the UE over the uplink channel using MIMO communication, the base station is also capable of serving the UE over the uplink channel using SISO communication, and the base station receives data from the UE over the uplink channel. As disclosed, the base station includes an antenna structure configured for communication over the air interface, a backhaul interface for sending the received data via a backhaul connection to an entity of a core access network, and a controller configured to carry out various base station operations as described herein. By way of example, the base station operations could include determining that the backhaul connection is threshold highly congested and, responsive to the determining that the backhaul connection is threshold highly congested, causing the base station to transition from serving the UE over the uplink channel using MIMO communication to serving the UE over the uplink channel using SISO communication.

Still further, disclosed is a method of controlling communication over an uplink channel of an air interface between a UE and a relay base station, where the relay base station is capable of serving the UE over the uplink channel using MIMO communication, and the relay base station is also capable of serving the UE over the uplink channel using SISO communication. Further, when serving the UE, the relay base station receives data from the UE over the uplink channel, and the relay base station outputs the received data to an entity of a core access network via a wireless backhaul connection defined by an air interface between a relay UE and a donor base station that serves the relay UE. As disclosed, the method includes determining that the backhaul connection is threshold highly congested and, responsive to the determining that the backhaul connection is threshold highly congested, the relay base station transitioning from serving the UE over the uplink channel using MIMO communication to serving the UE over the uplink channel using SISO communication.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
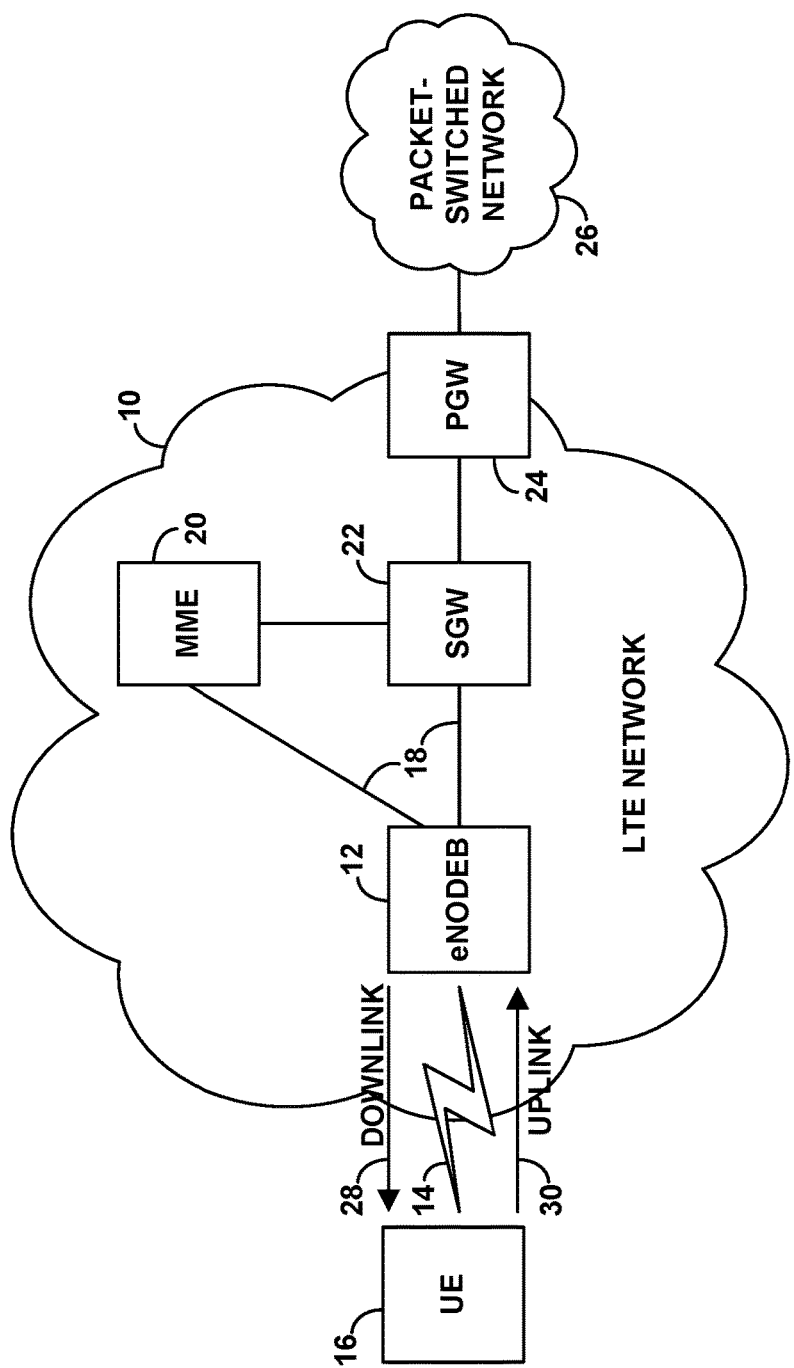
FIG. 1 is a simplified block diagram of an example wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but could also provide other functions.

As shown, the LTE network includes a base station 12, referred to as an evolved-Node-B (eNodeB), which has an antenna structure and associated equipment for providing an LTE coverage area 14 in which to serve UEs such as an example UE 16 as shown. The eNodeB 12 is then connected to various other LTE network entities via a backhaul connection 18. The backhaul connection can define an uplink direction from the eNodeB to the other LTE network entities and a downlink direction from the LTE network entities to the eNodeB. As shown, the network entities can include a mobility management entity (MME) 20 and a serving gateway (SGW) 22. The MME 20, which functions as a signaling controller for the LTE network, has a communication interface with the SGW 22, and the SGW 22 has a communication interface with a packet-data network gateway (PGW) 24 that provides connectivity with a packet-switched network 26. In practice, the illustrated components of the LTE network could sit as nodes on a private packet-switched network owned by an operator of the LTE network, and thus the various communication interfaces could be logical interfaces through that network. With the arrangement of FIG. 1, the UE could engage in communication with various remote communication-entities, such as servers or other end-user devices, on or via network 26.

As illustrated, the air interface of coverage area 14 defines a downlink direction 28 from the eNodeB to the UE and an uplink direction 30 from the UE to the eNodeB. Further, the eNodeB and UE could be configured (e.g., licensed and programmed) to support air interface communication on various particular carriers, which could be FDD or TDD. Each such carrier and/or its particular downlink and uplink channels may span a particular bandwidth (such as 1.4 MHz, 3 MHz, 5 MHz, 10 MHz, 15 MHz, or 20 MHz) and may be identified by one or more globally unique identifiers per industry standard, so that the eNodeB and a served UE can refer to particular carriers by those identifiers.

According to LTE, each carrier's downlink channel could then define various sub-channels, such as a physical downlink control channel (PDCCH) for carrying scheduling directives and other control signaling from the eNodeB to UEs, a physical downlink shared channel (PDSCH) defining resource blocks for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) defining uplink resource blocks for carrying scheduled uplink data communication.

With this arrangement, when UE 16 enters into coverage of eNodeB 12, the UE could detect the eNodeB's coverage on a particular carrier, and the UE and eNodeB could engage in an attach process or handover process to register with the LTE network on that carrier, configuring service of the UE by the eNodeB on that carrier. For instance, the UE could initially transmit an access request message on the carrier to the eNodeB, and the UE and eNodeB could then engage in signaling in accordance with the Radio Resource Control (RRC) protocol to establish a radio-link-layer connection (RRC connection) on which the UE and eNodeB can engage in further communication. In turn, the UE could then transmit to the eNodeB via the RRC connection an attach request seeking to register with the LTE network and be served by the eNodeB, and the eNodeB could pass, via the backhaul connection, the attach request to the MME for processing.

After authenticating the UE, the MME could then engage in signaling with the eNodeB and SGW to establish for the UE one or more logical bearer connections, or bearers, between the UE and the PGW. Each such bearer could include a radio bearer portion over the air between the UE and the eNodeB, and a service bearer or access bearer portion between the eNodeB and the PGW via the SGW, with the service bearer or access bearer forming part of the backhaul connection. Further, the eNodeB could store a context record for the UE, indicating service state and parameters for serving the UE, such as an identification of the carrier on which the eNodeB is serving the UE. And the UE could likewise store a context record indicating its service state and parameters for being served, such as the carrier on which it is being served.

With service of the UE so configured, the eNodeB could then coordinate data communication to and from the UE. As the eNodeB receives, from the SGW via the backhaul connection, downlink data destined to the UE, the eNodeB could allocate particular PDSCH resource blocks for carrying that data. The eNodeB could then transmit on the PDCCH to the UE a DCI message specifying the allocated downlink resource blocks, and the eNodeB could transmit the data to the UE on the specified downlink resource blocks, for receipt by the UE. Likewise, when the eNodeB receives from the UE a scheduling request indicating that the UE has uplink data to transmit, the eNodeB could allocate particular PUCCH resource blocks for carrying that data. The eNodeB could then transmit on the PDCCH to the UE a DCI message specifying the allocated uplink resource blocks, and the UE could then transmit the data on the specified uplink resource blocks, for receipt by the eNodeB. The eNodeB could then forward the received data via the backhaul connection to the SGW.

In practice, the eNodeB and the UE could support both SISO communication defining a single layer of data communication and MIMO communication defining multiple concurrent layers of data communication, optimally with spatial multiplexing to help distinguish the layers from each other. To facilitate this, the eNodeB and the UE could each be equipped with multiple separate antennas (or antenna systems, arrays, groups, or the like) arranged or configurable to engage in RF communication on separate respective propagation paths, in a well-known manner. For transmitting signals using MIMO, the eNodeB and the UE could be equipped with a multiplexer for separating a signal into a number of distinctly encoded independent data streams, one for each antenna. For receiving signals using MIMO, the eNodeB and the UE could be equipped with a decoder for combining the received data streams into the original signal. As such, the data streams can be concurrently transmitted by multiple antennas at the transmitting end and concurrently received by multiple antennas at the receiving end.

By concurrently communicating a signal over multiple layers of communication, the use of MIMO allows the signal to be communicated at a higher rate, with more layers corresponding to a higher data transfer rate. In practice, the number of layers supported by the eNodeB and UE could depend on their respective antenna configurations, with the maximum number of supported layers being equivalent to the smaller of the number of transmitting antennas and the number of receiving antennas. To facilitate scheduling communication on an appropriate number of MIMO layers, the eNodeB could learn the UE's layer capability through a UE-capability report provided during attachment or the like, or from a network-based capabilities-record for the UE.

When the eNodeB schedules data communication to or from a UE on allocated air interface resources, the eNodeB could configure SISO or MIMO communication of the data. To do so, the eNodeB could include in its DCI message to the UE an indication of the number of communication layers, such as by including in a precoding field of the DCI message a bit pattern that maps to the number of layers to be used. In order to configure SISO communication, the DCI message could specify use of a single layer. With a MIMO configuration where T=R, the number of layers specified could be a number that equals T and R, so that a specification of 2 layers could represent 2×2 MIMO, a specification of 4 layers could represent 4×4 MIMO, and a specification of 8 layers could represent 8×8 MIMO, and so forth. Further, more particular indications could be provided for other MIMO configurations, such as to indicate a MIMO configuration where T and R differ from each other.

With some variation possible, all of the multiple MIMO layers could share the allocated air interface resources. For instance, if the eNodeB allocates ten resource blocks on a carrier and designates two-layer MIMO communication, two separate MIMO layers of data could be transmitted concurrently on the resources of those ten resource blocks, optimally with the two layers being differentiated from each other by their spatial multiplexing. Likewise, if the eNodeB allocates ten resource blocks respectively on each of two carriers, for a total of twenty resource blocks, and the eNodeB designates two-layer MIMO communication, two discrete MIMO layers of data could be transmitted concurrently on the resources of those twenty resource blocks, again optimally with the layers being differentiated from each other by at least their spatially separate RF propagation paths.

As noted above, when an eNodeB receives a significant amount of uplink traffic from its served UEs, the eNodeB's uplink backhaul connection could become congested with data queued for transmission from the eNodeB to one or more other network entities, such as an MME or SGW. For instance, the eNodeB could have a capped rate at which the eNodeB can transmit uplink data via the backhaul connection. This capped rate could be defined by an artificially imposed bandwidth limit on the backhaul connection or by physical limitations of the backhaul connection. If the eNodeB receives uplink data from its served UEs at a greater rate than the capped rate of the backhaul connection, then the eNodeB could transmit the received data via the uplink backhaul connection at or below the capped rate while buffering any excess data (e.g., data received at a rate that exceeds the capped rate). For this purpose, the eNodeB could establish and maintain in physical data storage a data buffer in which the excess data could be temporarily stored.

In practice, when the eNodeB is buffering excess data for transmission to a network entity via the uplink backhaul connection, the excess data could reside in the eNodeB's data buffer for some time duration until the eNodeB is ready to transmit the excess data. This time duration could vary depending on the circumstances. For instance, the eNodeB could employ a first-in first-out (FIFO) method in which data is retrieved from the data buffer in the same order that the data is recorded in the data buffer. In such a system, a particular data packet could reside in the data buffer until the eNodeB has retrieved and transmitted all data packets that were recorded in the data buffer prior to recording the particular data packet in the data buffer, and then the eNodeB could retrieve the particular data packet for transmission via the backhaul connection. As such, data recorded in a substantially full data buffer could have a longer buffer time than data recorded in a substantially empty data buffer. Long buffer times could add significant delay to data transmissions via the backhaul connection, thereby resulting in a poor user experience.

In accordance with the present disclosure, responsive to detecting threshold high congestion on the uplink backhaul connection, the eNodeB could transition from serving a UE using uplink MIMO communication to serving the UE using uplink SISO communication. By making such a transition, the eNodeB could reduce the rate at which the eNodeB receives uplink data from the UE, thereby reducing the amount of congested data queued for uplink transmission via the backhaul connection.

The eNodeB could be configured to detect threshold high congestion on the uplink backhaul connection in various ways. In one example, the eNodeB could detect threshold high congestion based on an evaluation of a quantity of data buffered for uplink transmission from the eNodeB over the backhaul connection. For instance, the eNodeB could determine the quantity of uplink data stored in the eNodeB's data buffer that is queued for transmission over the backhaul connection. If the determined quantity of data exceeds a threshold quantity, then the eNodeB could determine that the backhaul connection is threshold highly congested.

In another example, the eNodeB could detect threshold high congestion based on an evaluation of how long uplink data has been queued for transmission via the backhaul connection. For instance, the eNodeB could determine how long data packets destined for the backhaul connection have been stored in the eNodeB's data buffer. If, for example, over a recent time period the average storage time for the data packets exceeds a threshold time, then the eNodeB could determine that the backhaul connection is threshold highly congested. Other examples are possible as well.

In line with the discussion above, once the eNodeB detects that the uplink backhaul connection is threshold highly congested, the eNodeB could responsively identify which of its served UEs the eNodeB is serving using multiple layer uplink MIMO communication and reduce the number of MIMO layers on which the eNodeB serves the identified UEs. By way of example, the eNodeB could identify a particular UE as using uplink MIMO communication by determining that, when scheduling uplink communication from the UE, one or more DCI messages recently sent to the UE specified the use of N communication layers, where N>1. If the UE then sends another scheduling request to the eNodeB, the eNodeB could respond with a DCI message specifying the use of M communication layers, where M<N. And in accordance with the DCI message, the UE and eNodeB could then engage in the scheduled uplink communication using the reduced quantity M of layers of communication. In some examples, the DCI message could specify the use of a single communication layer (i.e., M=1), such that the eNodeB would transition from serving the UE using uplink MIMO to using uplink SISO.

Figure 2:
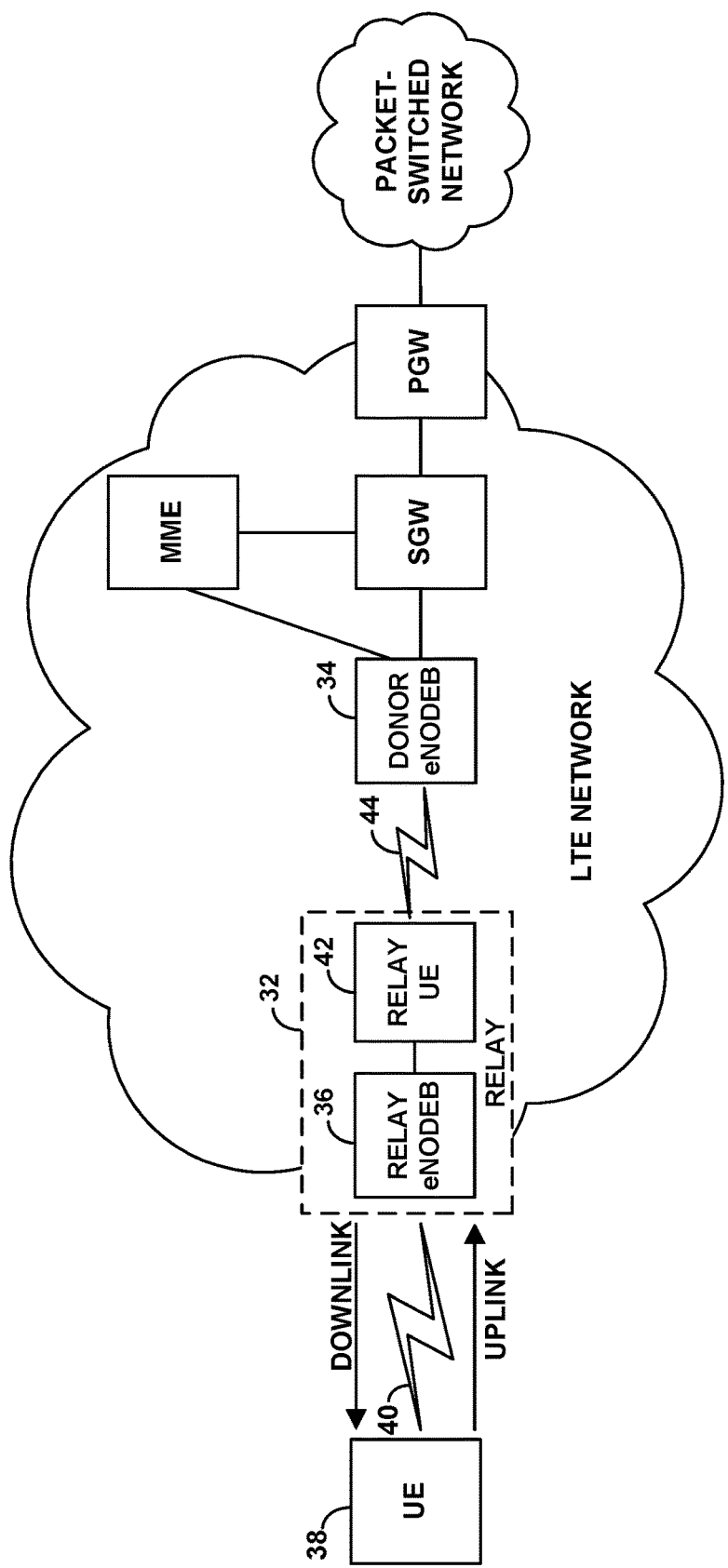
FIG. 2 is a simplified block diagram of another example wireless communication system in which the present method and system can be implemented.

Turning next to FIG. 2, an alternative arrangement of the wireless communication system of FIG. 1 is shown. In this alternative arrangement, the LTE network additionally includes relay 32, which has a wireless backhaul connection with donor eNodeB 34. In particular, relay 32 includes relay eNodeB 36 configured to serve UE 38 over air interface 40 using a SISO or MIMO configuration much like eNodeB 12 discussed above. Relay 32 further includes relay UE 42 that is served by donor eNodeB 34 over air interface 44, with air interface 44 defining the wireless backhaul connection.

With this arrangement, relay eNodeB 36 could engage in communication with various core network entities in the same way as eNodeB 12, but those communications would pass via the wireless backhaul connection provided between donor eNodeB 34 and relay UE 42, and between relay UE 42 and relay eNodeB 36. Thus, when relay eNodeB 36 forwards uplink data from UE 38 to one or more core network entities as described above, those communications would pass via relay UE 42, via the wireless backhaul connection over air interface 44, and via donor eNodeB 34.

In practice, in order to pass uplink data from relay UE 42 to donor eNodeB 34, the relay UE could transmit to the donor eNodeB a scheduling request indicating that the relay UE has data to transmit. The donor eNodeB could then allocate particular uplink resource blocks for carrying that data, the donor eNodeB could transmit on a downlink channel to the relay UE a DCI message specifying the allocated uplink resource blocks, and the relay UE could then transmit the data on the specified uplink resource blocks, for receipt by the donor eNodeB.

As noted above, such a scheduling process could significantly reduce the rate at which uplink data is passed from the relay eNodeB via the backhaul connection to one or more other network entities, particularly if the wireless backhaul connection uses TDD multiplexing which could provide fewer available uplink resource blocks than FDD multiplexing. And if relay eNodeB 36 receives uplink data from UE 38 faster than the uplink data can be scheduled for transmission and subsequently transmitted over air interface 44, then the wireless backhaul connection could become congested with excess data. To accommodate such excess data, the relay UE could be provisioned with a data buffer, similar to the eNodeB data buffer discussed above, in which the excess data could be temporarily stored and queued for transmission via the wireless backhaul connection.

In further accordance with the present disclosure, if the relay eNodeB is serving one or more UEs using uplink MIMO, then, responsive to detecting threshold high congestion on the wireless backhaul connection, the relay eNodeB could transition from serving the UEs using uplink MIMO to serving the UEs using uplink SISO. As such, the relay eNodeB could reduce the rate at which the relay eNodeB receives uplink data from the UEs, thereby reducing the amount of congested data queued for transmission via the wireless backhaul connection.

To facilitate this, the relay eNodeB could be configured to detect threshold high congestion on the wireless backhaul connection in various ways. In one example, the relay eNodeB could detect threshold high congestion based on an evaluation of a quantity of data buffered for transmission from the relay UE to the donor eNodeB over the wireless backhaul connection. For instance, the relay eNodeB could receive from the relay UE a message indicating a quantity of data stored in the relay UE's data buffer that is queued for transmission to the donor eNodeB over the wireless backhaul connection. If the indicated quantity of data exceeds a threshold quantity, then the relay eNodeB could determine that the wireless backhaul connection is threshold highly congested.

In another example, the relay eNodeB could detect threshold high congestion based on an evaluation of how long uplink data has been queued for transmission from the relay UE to the donor eNodeB. For instance, the message from the relay UE could indicate how long data packets destined to the donor eNodeB have been stored in the relay UE's data buffer. The message could specify an average storage time for such data packets over a recent time period, and if the average storage time exceeds a threshold time, then the relay eNodeB could determine that the wireless backhaul connection is threshold highly congested. Other examples are possible as well.

Further, in some examples, the wireless backhaul connection could become congested due to the accumulation of queued data at the donor eNodeB rather than at the relay UE. For instance, in addition to serving relay UE 42, donor eNodeB 34 could also serve a number of end-user UEs. As such, donor eNodeB 34 could be configured to forward uplink data from relay UE 42 and from the end-user UEs to other core network entities, such as an MME or SGW. Like eNodeB 12, donor eNodeB 34 could forward such data via a dedicated backhaul connection that has a capped data transfer rate. And if donor eNodeB 34 receives uplink data from relay UE 42 and from the end-user UEs at a rate that exceeds the capped rate of the backhaul connection, then donor eNodeB 34 could temporarily store the excess data in a data buffer as discussed above.

As such, relay eNodeB 36 could detect threshold high congestion on the wireless backhaul connection based on an evaluation of data buffered for transmission from donor eNodeB 34 to one or more other network entities. For instance, relay eNodeB 36 could receive from donor eNodeB 34 a message indicating a quantity of uplink data stored in the donor eNodeB's data buffer. Donor eNodeB 34 could transmit the message to relay eNodeB 36 using inter-base station signaling (e.g., using X2 signaling in an LTE network) over the wireless backhaul connection via relay UE

42. If the indicated quantity of uplink data exceeds a threshold quantity, then relay eNodeB 36 could determine that the wireless backhaul connection is threshold highly congested. In another example, the message from donor eNodeB 34 could indicate how long uplink data packets have been stored in the donor eNodeB's data buffer. The message could specify an average storage time for such data packets over a recent time period, and if the average storage time exceeds a threshold time, then relay eNodeB 36 could determine that the wireless backhaul connection is threshold highly congested. Other examples are possible as well.

Figure 3:
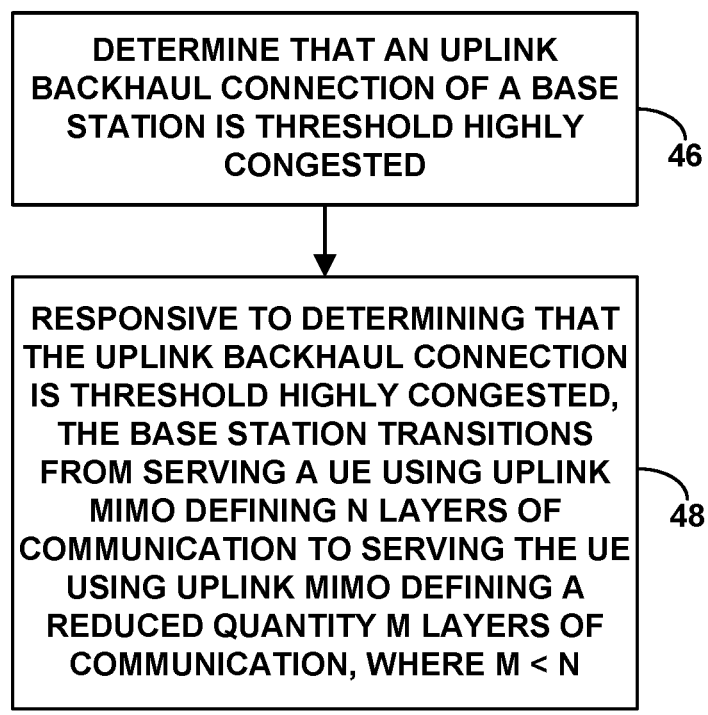
FIG. 3 is a flow chart depicting example operations in accordance with the disclosure.

FIG. 3 is next a flow chart depicting a method that can be carried out in accordance with this disclosure, to control communication over an uplink channel of an air interface between a UE and a base station. These operations could be carried out in an access network in which the base station is configured to serve the UE over the uplink channel using MIMO communication defining N layers of communication, where N>1. In such an arrangement, the base station receives data from the UE over the uplink channel, and sends the received data via an uplink backhaul connection to an entity of a core access network.

As shown in FIG. 3, at block 46, the method includes the base station determining that the backhaul connection is threshold highly congested. And at block 48, the method includes the base station, responsive to determining that the backhaul connection is threshold highly congested, transitioning from serving the UE over the uplink channel using MIMO communication defining N layers of communication to serving the UE over the uplink channel using MIMO communication defining a reduced quantity M of layers of communication, wherein M<N, and wherein M≥1.

In line with the discussion above, the act of determining that the backhaul connection is threshold highly congested could be based on an evaluation of (i) a quantity of uplink data buffered for transmission from the base station via the backhaul connection or (ii) how long uplink data has been queued for transmission from the base station via the backhaul connection.

Further, as discussed above, the base station could be a relay base station, and the backhaul connection could include a wireless backhaul connection supported by a relay UE and a donor base station. As such, the act of determining that the backhaul connection is threshold highly congested could be based on an evaluation of (i) a quantity of uplink data buffered for transmission from the relay UE to the donor base station, (ii) how long uplink data has been queued for transmission from the relay UE to the donor base station, (iii) a quantity of uplink data buffered for transmission from the donor base station to one or more other network entities, or (iv) how long uplink data has been queued for transmission from the donor base station to one or more other network entities.

Additionally, as discussed above, the act of transitioning from serving the UE over the uplink channel using MIMO communication defining N layers of communication to serving the UE over the uplink channel using MIMO communication defining a reduced quantity M of layers of communication could involve, when scheduling data communication from the UE to the base station, the base station transmitting to the UE via a downlink control channel a DCI message specifying the use of M layers of communication. As further discussed above, the DCI message could specify the use of a single layer, such that the base station transitions from serving the UE using uplink MIMO communication to serving the UE using uplink SISO communication. And in accordance with the DCI message, the UE and base station could then engage in the scheduled communication using the specified quantity of layers.

Figure 4:
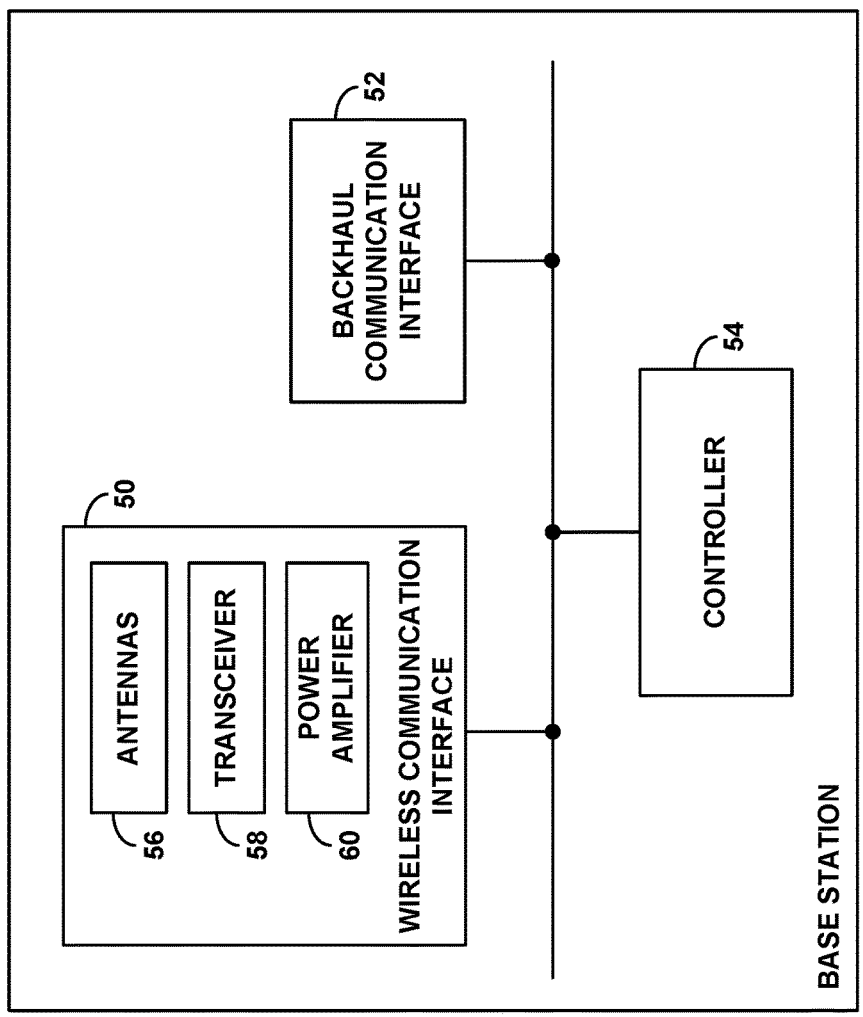
FIG. 4 is a simplified block diagram of an example base station operable in accordance with the disclosure.

Finally, FIG. 4 is a simplified block diagram of an example base station operable in line with the discussion above. As shown, the example base station includes a wireless communication interface 50, a backhaul communication interface 52, and a controller 54, which could be integrated or communicatively linked together.

The wireless communication interface 50 could include antennas 56, a transceiver 58, and a power amplifier 60, to cooperatively facilitate air interface communication. And the backhaul communication interface 52 could include a wired and/or wireless network communication module configured to support communication via a backhaul connection with one or more entities of a core access network such as those shown in FIG. 1 for instance.

The controller 54 could then be configured (e.g., with one or more processing units, non-transitory data storage, and program instructions stored in the data storage and executable by the one or more processing units) to carry out various operations described herein. For example, the controller could be configured to (i) determine that the base station's backhaul connection is threshold highly congested and (ii) responsive to determining that the backhaul connection is threshold highly congested, cause the base station to transition from serving a UE over an uplink channel using MIMO communication to serving the UE over the uplink channel using SISO communication.

Various features described above in connection with particular embodiments or implementations can be applied as well in connection with other embodiments or implementations. Further, those skilled in the art will understand that various changes and modifications may be made to the described embodiments and implementations without departing from the true scope and spirit of the invention.

We claim:

1. A method of controlling communication over an uplink channel of an air interface between a user equipment device (UE) and a base station, wherein the base station is configured to serve the UE over the uplink channel using multiple-input multiple-output (MIMO) communication defining N layers of communication, wherein N>1, wherein the base station receives data from the UE over the uplink channel, and wherein the base station sends the received data via a backhaul connection to an entity of a core access network, the method comprising:

determining that the backhaul connection is threshold highly congested; and responsive to the determining that the backhaul connection is threshold highly congested, the base station transitioning from serving the UE over the uplink channel using MIMO communication defining N layers of communication to serving the UE over the uplink channel using MIMO communication defining a reduced quantity M of layers of communication, wherein M<N, and wherein M≥1.

2. The method of claim 1, wherein M=1, such that the base station transitions from serving the UE over the uplink channel using MIMO communication defining N layers of communication to serving the UE over the uplink channel using single-input single-output (SISO) communication.

3. The method of claim 1, wherein determining that the backhaul connection is threshold highly congested is based at least in part on an evaluation of a quantity of data buffered for transmission via the backhaul connection.

4. The method of claim 1, wherein determining that the backhaul connection is threshold highly congested is based at least in part on an evaluation of how long uplink data has been queued for transmission via the backhaul connection.

5. The method of claim 1, wherein the base station is a relay base station that is served by a relay user equipment device (relay UE), wherein the backhaul connection comprises a wireless backhaul connection between the relay UE and a donor base station configured to serve the relay UE, and wherein determining that the backhaul connection is threshold highly congested comprises determining that the wireless backhaul connection is threshold highly congested.

6. The method of claim 5, wherein determining that the wireless backhaul connection is threshold highly congested is based at least in part on an evaluation of a quantity of data buffered for transmission from the relay UE to the donor base station.

7. The method of claim 5, wherein determining that the wireless backhaul connection is threshold highly congested is based at least in part on an evaluation of how long uplink data has been queued for transmission from the relay UE to the donor base station.

8. The method of claim 5, wherein determining that the wireless backhaul connection is threshold highly congested is based at least in part on an evaluation of a quantity of data buffered for transmission from the donor base station to the entity of the core access network.

9. The method of claim 5, wherein determining that the wireless backhaul connection is threshold highly congested is based at least in part on an evaluation of how long uplink data has been queued for transmission from the donor base station to the entity of the core access network.

10. The method of claim 1, wherein the base station transitioning from serving the UE over the uplink channel using MIMO communication defining N layers of communication to serving the UE over the uplink channel using MIMO communication defining a reduced quantity M of layers of communication comprises:
    scheduling data communication to occur from the UE to the base station, wherein scheduling data communication comprises transmitting to the UE over the air interface a scheduling directive specifying the use of M layers for the data communication, and
    in accordance with the scheduling directive, engaging in the scheduled data communication from the UE using M layers of communication.

11. The method of claim 10, wherein the scheduling directive is a Downlink Control Information (DCI) message, and wherein transmitting the scheduling directive to the UE over the air interface comprises transmitting the DCI message on a downlink control channel for receipt by the UE.

12. A base station configured to control communication over an uplink channel of an air interface between a user equipment device (UE) and the base station, wherein the base station is capable of serving the UE over the uplink channel using multiple-input multiple-output (MIMO) and the base station is capable of serving the UE over the uplink channel using single-input single-output (SISO) communication, and wherein the base station receives data from the UE over the uplink channel, the base station comprising:
    an antenna structure configured for communication over the air interface;
    a backhaul interface for sending the received data via a backhaul connection to an entity of a core access network; and
    a controller configured to carry out operations including
        (i) determining that the backhaul connection is threshold highly congested and (ii) responsive to the determining that the backhaul connection is threshold highly congested, causing the base station to transition from serving the UE over the uplink channel using MIMO communication to serving the UE over the uplink channel using SISO communication.

13. The base station of claim 12, wherein the base station is a relay base station that is served by a relay user equipment device (relay UE), wherein the backhaul connection comprises a wireless backhaul connection between the relay UE and a donor base station configured to serve the relay UE, and wherein determining that the backhaul connection is threshold highly congested comprises determining that the wireless backhaul connection is threshold highly congested.

14. The base station of claim 13, wherein determining that the wireless backhaul connection is threshold highly congested is based at least in part on an evaluation of a quantity of data buffered for transmission from the relay UE to the donor base station.

15. The base station of claim 13, wherein determining that the wireless backhaul connection is threshold highly congested is based at least in part on an evaluation of how long uplink data has been queued for transmission from the relay UE to the donor base station.

16. The base station of claim 13, wherein determining that the wireless backhaul connection is threshold highly congested is based at least in part on (i) an evaluation of a quantity of data buffered for transmission from the donor base station to the entity of the core access network or (ii) an evaluation of how long uplink data has been queued for transmission from the donor base station to the entity of the core access network.

17. The base station of claim 13, wherein causing the base station to transition from serving the UE over the uplink channel using MIMO to serving the UE over the uplink channel using SISO comprises:
    causing the base station to schedule data communication from the UE to the base station, wherein scheduling data communication comprises transmitting to the UE over the air interface a scheduling directive specifying the use of SISO for the data communication; and
    in accordance with the scheduling directive, causing the base station to engage in the scheduled data communication from the UE using SISO.

18. A method of controlling communication over an uplink channel between a user equipment device (UE) and a relay base station, wherein the relay base station is capable of serving the UE over the uplink channel using multiple-input multiple-output (MIMO) and the relay base station is capable of serving the UE over the uplink channel using single-input single-output (SISO) communication, wherein the relay base station receives data from the UE over the uplink channel, and wherein the relay base station outputs the received data to an entity of a core access network via a wireless backhaul connection defined by an air interface between a relay user equipment device (relay UE) and a donor base station that serves the relay UE, the method comprising:
    determining that the backhaul connection is threshold highly congested; and
    responsive to the determining that the backhaul connection is threshold highly congested, the relay base station transitioning from serving the UE over the uplink channel using MIMO communication to serving the UE over the uplink channel using SISO communication.

19. The method of claim 18, wherein determining that the backhaul connection is threshold highly congested comprises:
- receiving, by the relay base station from the relay UE, a message that specifies a quantity of buffered data at the relay UE to be transmitted to the donor base station over the wireless backhaul connection;
- determining, by the relay base station, that the specified quantity of buffered data at the relay UE exceeds a threshold quantity; and
- based on the determining that the specified quantity of buffered data at the relay UE exceeds the threshold quantity, determining that the backhaul connection is threshold highly congested.

20. The method of claim 18, wherein determining that the backhaul connection is threshold highly congested comprises:
- receiving, by the relay base station from the relay UE, a message that specifies an amount of time for which data destined to the donor base station is queued at the relay UE;
- determining, by the relay base station, that the specified amount of time exceeds a threshold amount of time; and
- based on the determining that the specified amount of time exceeds the threshold amount of time, determining that the backhaul connection is threshold highly congested.

* * * * *